(12) United States Patent
Chen

(10) Patent No.: US 10,359,776 B2
(45) Date of Patent: Jul. 23, 2019

(54) SYSTEMS, APPARATUS, AND METHODS FOR AUTOMATIC GENERATION CONTROL BASED ON COMPREHENSIVE CONTROL PERFORMANCE STANDARD GREEN ZONE CONTROL

(71) Applicant: Siemens Industry, Inc., Alpharetta, GA (US)

(72) Inventor: Dingguo Chen, Eden Prairie, MN (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 167 days.

(21) Appl. No.: 15/719,727

(22) Filed: Sep. 29, 2017

(65) Prior Publication Data

US 2018/0239348 A1 Aug. 23, 2018

Related U.S. Application Data

(60) Provisional application No. 62/462,461, filed on Feb. 23, 2017.

(51) Int. Cl.
*G05B 23/02* (2006.01)
*H02J 3/38* (2006.01)
*G05B 15/02* (2006.01)
*H02J 13/00* (2006.01)
*H02J 3/00* (2006.01)

(52) U.S. Cl.
CPC ......... *G05B 23/0294* (2013.01); *G05B 15/02* (2013.01); *G05B 23/0289* (2013.01); *H02J 3/38* (2013.01); *H02J 13/0006* (2013.01); *H02J 2003/007* (2013.01); *Y02E 40/72* (2013.01); *Y04S 10/12* (2013.01)

(58) Field of Classification Search
CPC .... G05B 23/0289; G05B 23/0294; H02J 3/38
See application file for complete search history.

(56) References Cited

U.S. PATENT DOCUMENTS

| 9,997,956 | B1 * | 6/2018 | Chen | H02J 3/005 |
| 2016/0149408 | A1 * | 5/2016 | Chen | H02J 3/381 |
| | | | | 700/296 |
| 2018/0239317 | A1 * | 8/2018 | Chen | H02J 3/381 |

OTHER PUBLICATIONS

NERC Training Document CPS Overview, May 23, 2002, NERC Training Working Group, pp. 1-12. (Year: 2002).*

* cited by examiner

*Primary Examiner* — Mark A Connolly

(57) ABSTRACT

Embodiments provide systems, apparatus, and methods for power distribution operated under automatic generation control (AGC) based on comprehensive control performance standard (CPS) green zone control. Embodiments include a plurality of power generating resources operating within a control area; a plurality of power consuming loads; a power transmission network coupling the resources to the loads; and an energy management system (EMS) in communication with the resources and configured to control operation of the resources within the control area. The EMS is operative to: determine a control performance standard (CPS) green zone; operate an automatic generation control (AGC) system of the EMS in the determined CPS green zone; and output electricity to the loads from the resources under the control of the AGC of the EMS operating in the green zone. Numerous additional aspects are disclosed.

20 Claims, 7 Drawing Sheets

SYSTEMS, APPARATUS, AND METHODS FOR AUTOMATIC GENERATION CONTROL BASED ON COMPREHENSIVE CONTROL PERFORMANCE STANDARD GREEN ZONE CONTROL

RELATED APPLICATION

The present application claims priority to U.S. Provisional Patent Application No. 62/462,461, filed Feb. 23, 2017, and entitled "METHOD AND SYSTEM FOR PERFORMANCE CONTROL AND ENERGY MANAGEMENT" which is hereby incorporated herein by reference in its entirety for all purposes.

FIELD

The present invention relates to operating energy systems, and more specifically to automatic generation control (AGC) based on comprehensive control performance standard (CPS) green zone control of such systems.

BACKGROUND

Around the world, energy systems are organized in networks or interconnections of generating resources and loads (e.g., customers). For example, the power system of North America is divided into five major Interconnections. These Interconnections can be thought of as frequency independent islands. The North American Interconnections include the Western Interconnection, the Electric Reliability Council of Texas (ERCOT), the Eastern Interconnection, the Alaska Interconnection, and the Quebec Interconnection. Each Interconnection can be thought of as a large machine, as every operating generating asset within the island is pulling in tandem with the others to supply electricity to all customers. This occurs as a result of the rotation of the electric generating assets, nearly all in (steady-state) synchronism. The "speed" of rotation of the Interconnection is measured as frequency, measured in cycles per second or Hertz (Hz). If the total Interconnection generation exceeds customer demand, frequency increases beyond the target value, typically 60 Hz, until energy balance is achieved. Conversely, if there is a temporary generation deficiency, frequency declines until balance is again restored at a point below the scheduled frequency. Balance is initially restored in each case due to load that varies with frequency and generator governors that change generator output in response to frequency changes. Some electric devices, such as electric motors, use more energy if driven at a higher frequency and less at a lower frequency.

Power utilities and Independent System Operators (ISOs) are committed to controlling the generating assets in their control areas in various ways in order to meet the North American Electric Reliability Corporation (NERC) mandated control performance standards (e.g., the CPS1 performance requirement and the CPS2 control performance requirement). Running CPS1 performance statistics and CPS2 performance statistics are fed back into the control mechanism of the system to ensure that at the end of each 12-month time period the overall yearly control performance statistics are satisfactory and monthly CPS2 performance is satisfactory. However, existing systems can still exhibit compliance violations. Thus, what is needed are improved systems, apparatus, and methods for energy generation and performance control within energy systems.

SUMMARY

In some embodiments, a power distribution system using automatic generation control is provided. The system includes a plurality of power generating resources operating within a control area; a plurality of power consuming loads; a power transmission network coupling the resources to the loads; and an energy management system (EMS) in communication with the resources and configured to control operation of the resources within the control area. The EMS is operative to: determine a control performance standard (CPS) green zone; operate an automatic generation control (AGC) system of the EMS in the determined CPS green zone; and output electricity to the loads from the power generating resources under the control of the AGC of the EMS operating in the green zone.

In some other embodiments, a power distribution method using AGC is provided. The method includes determining a CPS green zone; operating an AGC system of an EMS in the determined CPS green zone; and outputting electricity to a plurality of loads from a plurality of generating resources under the control of the AGC of the EMS operating in the green zone.

In yet other embodiments, an energy management system using automatic generation control is provided. The energy management system includes a processor in communication with a plurality of power generating resources; and a memory storing instructions executable on the processor. The instructions are operable to determine a CPS green zone; operate an AGC system of the EMS in the determined CPS green zone; and output electricity to the loads from the resources under the control of the AGC of the EMS operating in the green zone.

Still other features, aspects, and advantages of embodiments will become more fully apparent from the following detailed description, the appended claims, and the accompanying drawings by illustrating a number of example embodiments and implementations, including the best mode contemplated for carrying out the embodiments. Embodiments may also be capable of other and different applications, and several details may be modified in various respects, all without departing from the spirit and scope of the disclosed embodiments. Accordingly, the drawings and descriptions are to be regarded as illustrative in nature, and not as restrictive. The drawings are not necessarily drawn to scale.

DETAILED DESCRIPTION

Figure 1:
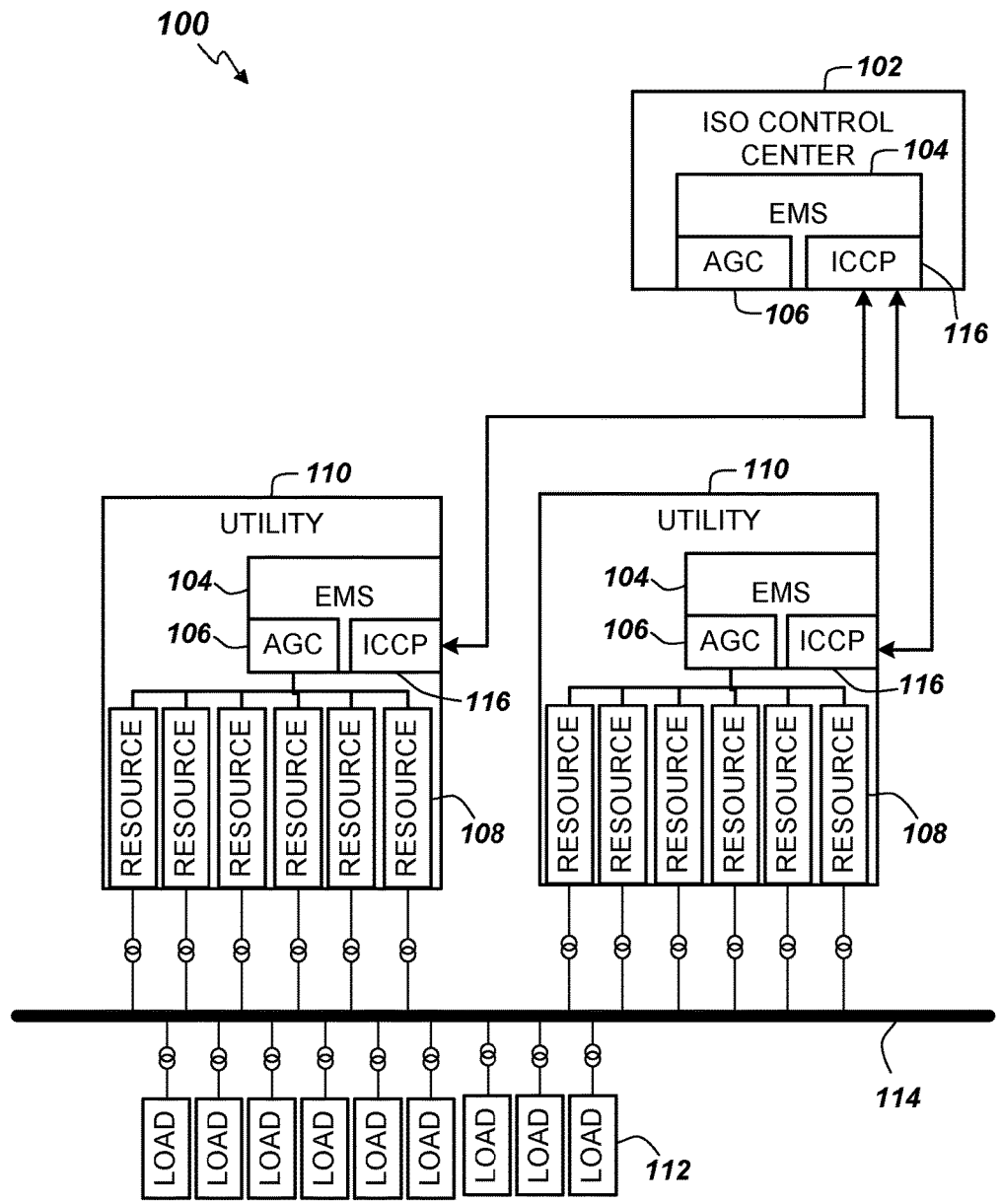
FIG. 1 illustrates a block diagram depicting an example power distribution system according to some embodiments.

Embodiments disclosed herein describe an energy management system enhanced to facilitate automatic generation control (AGC) based on comprehensive control performance standard (CPS) green zone control of energy delivery systems. Comprehensive CPS green zone control represents a set of fundamental enhancements to conventional AGC applications, specifically, load frequency control (LFC) including CPS based control and predictive CPS control. These enhancements are responsible for targeting AGC to operate in a desired safe zone and determining the appropriate amount of system regulation required regulating area frequency and interchange so that the control area's performance meets the NERC control performance standards (e.g., so that the overall 12-month CPS1 performance statistics and the overall monthly CPS2 performance statistics meet NERC Control Performance Standard (CPS) requirements in the case where both the CPS1 performance requirement and the CPS2 performance requirement are enforced). The enhanced LFC supports a novel approach of computing required control actions with several novel features.

In some embodiments, the control area's control action is determined based on various factors including, for CPS1 data, the overall running CPS1 performance statistics over the past 11 months and the current month until the current time; and the instantaneous CPS1 performance statistics for the current clock minute; and, for CPS2 data, the overall running CPS2 performance statistics over the current month until the current time; and the instantaneous CPS2 performance statistics for the current clock ten minute time period.

The enhanced LFC is operative to identify the CPS green zone. CPS green zone control logic computes the portion of the megawatt (MW) requirement that is calculated based on a permissible operating region defined in terms of the system frequency error and the tie line interchange error, which is defined by the intersection of the CPS1 and CPS2 operating limits (i.e., the Green Zone). The CPS green zone control logic computes the MW needed to handle the most restrictive problem with the CPS2, CPS1. In some embodiments, the CPS green zone control can be incorporated with predictive CPS control so the long term CPS control is able to optimize control actions with respect to the CPS compliance requirements and yet operate in the green zone with sufficient safety margin. The control area's corrective control action is progressive, but can be aggressive if necessary depending on the overall running control performance statistics relative to the control area's specified performances targets and the NERC control performance requirements.

As discussed above, power utilities and Independent System Operators (ISO) strive to control the generating assets in their control areas to meet the NERC mandated CPS1 and CPS2 performance requirements. The running CPS1 performance statistics and CPS2 performance statistics are fed back into the control mechanism to ensure that at the end of each 12-month time period the overall yearly control performance statistics are satisfactory and monthly CPS2 performance is satisfactory. Existing energy management systems (EMS) can include modules that perform CPS based control and predictive CPS control. In one sense, it can be said that the existing CPS based control is short term based which only incorporates the current instantaneous CPS1 performance and CPS2 performance into the AGC control; and the predictive CPS control is long term based, which considers the running CPS1 performance and CPS2 performance up until the current moment. In other words, 11 months in the past and the current month until the current moment is considered for CPS1 while the current month until the current moment is considered for CPS2, and this data is incorporated into the AGC control. These two mechanisms were designed to run exclusively. In some other existing systems, a mechanism has also been implemented to integrate long-term CPS control and short-term CPS control together in a coordinated manner. However, an issue with this integration of the long and short-term CPS controls is that the control is targeted at bringing the area control error (ACE) to zero when there is clock-10-minute ACE violation, which can potentially subject the system to short-term clock-minute CPS1 compliance violations. According to present embodiments, this potential issue is resolved by identifying a CPS green zone operating range and bringing the system state to approximately a center curve of the CPS green zone. In addition, some embodiments also incorporate the CPS green zone control effort with the CPS control and the predictive CPS control. This makes the control result more effective and yet leaves the system with sufficient margin to reduce the likelihood of a next immediate violation of CPS1 and CPS2 compliance requirements.

The LFC module is a cyclical running program with a generation control cycle time of a few seconds (e.g., 2 seconds, 4 seconds, 6 seconds). The LFC module is enhanced such that it is able to identify a CPS green zone (i.e., a safe operating range (further defined below)) and determine the control effort for the desired MW correction.

Turning now to FIG. 1, an example energy delivery system 100 is illustrated. Independent System Operators (ISO) operate control centers 102 that can include an EMS 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG), etc.), in response to changes in the load created by consumers of the electricity (e.g., loads 112). The generated power is delivered from the resources 108 to consumers via transmission lines 114. Note that the utilities 110 can include an EMS 104 with an AGC system 106. Appropriate transformers, switches, and circuit breakers can be used to allow the resources 108 to be connected and disconnected from the transmission lines 114 on command.

In some embodiments, EMS 104 further includes one or more Utility Communication Servers that each provide an implementation of an Inter-Control Center Communication Protocol (ICCP) 116 that enables communication with, for example, other EMSs in operation at, for example, several utilities 110. In some embodiments, ICCP 116 can be used to implement remote control of resources 108 by implementing AGC system 106 communications between different EMSs. The EMS 104 can also include a communication front end (CFE)/Real Time Data Server (RTDS) to facilitate communications with external entities and users via remote terminal units (RTUs). Note that RTUs can be part of the power utilities' field devices, for example.

Figure 2:
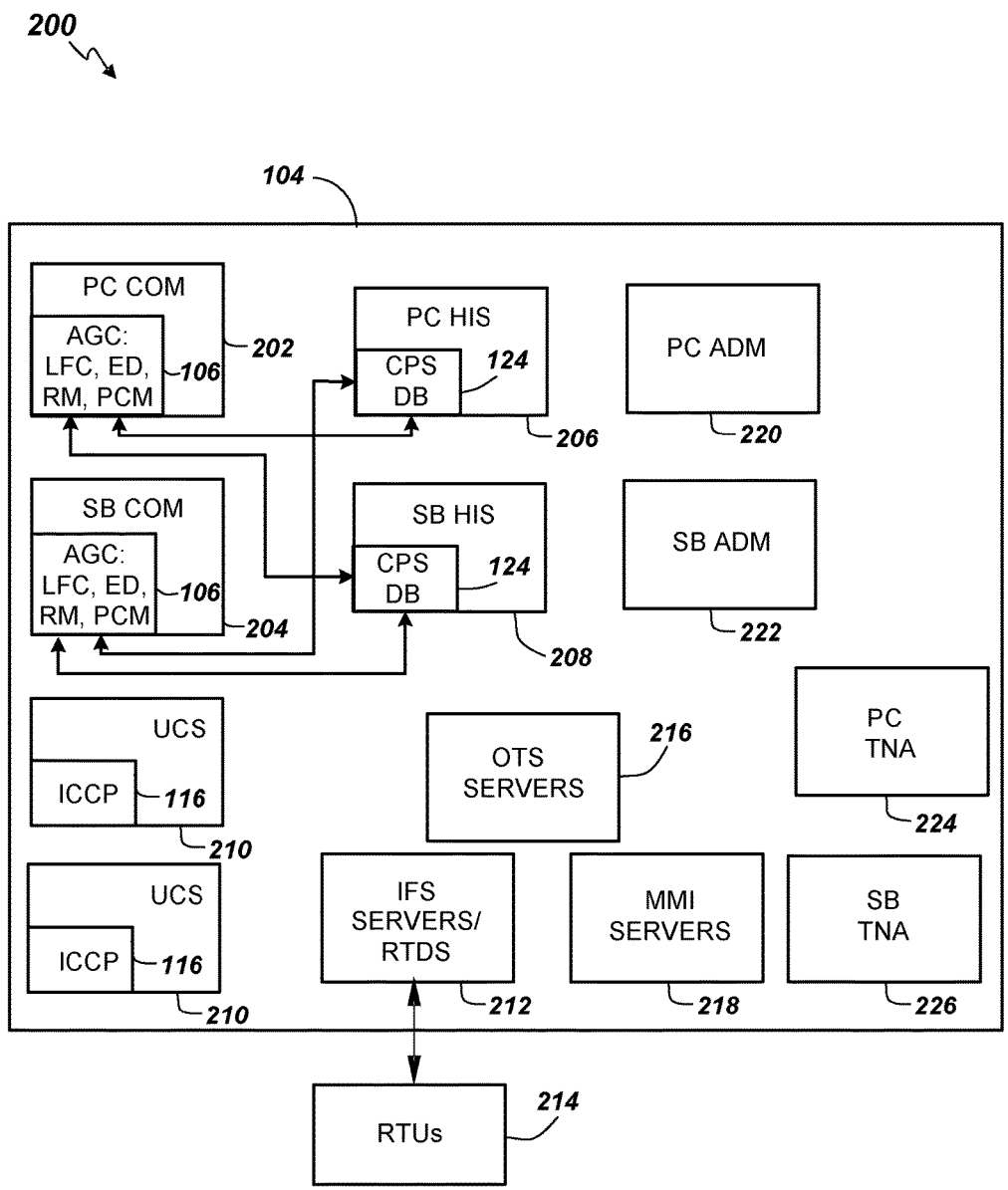
FIG. 2 illustrates a block diagram depicting an example energy management system according to some embodiments.

An example configuration of an EMS 104 that supports the operation of an AGC system 106 applications including an LFC module according to embodiments is depicted in FIG. 2. The AGC system 106 applications can be implemented within a Process Controller (PC) server 202 that also includes Communicator (COM) functionality. The EMS 104 can include redundant back-up servers to provide higher reliability and fault-tolerance. Thus, a Standby (SB) server 204 is also provided in some embodiments. A PC HIS server 206 that implements a Historical Information System (HIS) and a SB HIS server 208 that implements a backup HIS can also be included in the EMS 104. The lines connecting the PC server 202, the PC HIS server 206, the SB server 204, and the SB HIS server 208 represent data flows between these servers. The PC HIS server 206 includes and executes programs collecting real time AGC data from PC COM for archiving as per archiving requirements. The PC server 202 includes and executes programs that retrieve historical data from the PC HIS server 206 for various purposes, for instance, for CPS (Control Performance Standard) related real time control in AGC (Automatic Generation Control), for WECC (Western Electricity Coordinating Council) time error correction.

In some embodiments, the EMS 104 further includes one or more utility communication servers (UCS) 210 that each provide an implementation of an Inter-Control Center Communication Protocol (ICCP) 116 that enables communication with, for example, an EMS in operation at, for example, a utility 110 (FIG. 1). In some embodiments, ICCP 116 can be used to implement remote control of resources 108 (FIG. 1) by implementing system communications between an ISO control center 102 (FIG. 1) and a utility 110. The EMS 104 can also include an independent front end system (IFS) 212/Real Time Data Server (RTDS) to facilitate communications with external entities and users via remote terminal units (RTUs) 214. In some embodiments, the EMS 104 can also include a number of additional servers and applications. For example, the EMS 104 can include Operator Training Simulator (OTS) servers 216, Man-Machine Interface (MMI) servers 218, a PC Administration (ADM) application server 220, a SB ADM application server 222, a transmission network application (TNA) server 224, and a SB TNA server 226.

The LFC application enhancements include several function modules. These modules work together in a coordinated manner. The Predictive CPS1 Control module makes use of the overall CPS1 performance statistics over the past 11 months plus the current month up to the current moment and employs probability theory to determine the one-minute ACE target for short term CPS1 control. The Predictive CPS2 Control module makes use of the overall CPS2 performance statistics over the current month up to the current moment and employs probability theory to determine the ten-minute ACE target for short term CPS2 control. The Instantaneous CPS1 Control module incorporates the one-minute ACE target derived from the Long Term CPS1 Control and determines the control effort needed for CPS1 control. The Instantaneous CPS2 Control module incorporates the ten-minute ACE target derived from the Long Term CPS1 Control and determines the control effort needed for CPS2 control.

The Prioritization of CPS1 and CPS2 Control is determined as follows. If the CPS1 correction and the CPS2 correction are in the same direction, the greater correction is used. If the CPS1 correction and the CPS2 correction are in opposite directions, the CPS2 correction is used for control. If there is a CPS1 correction and no CPS2 correction, the CPS1 correction is used. If there is a CPS2 correction and no CPS1 correction, the CPS2 correction is used.

The CPS Green Zone Control module identifies the CPS green zone and determines the ACE control target.

Prioritization of CPS Green Zone Control and Predictive CPS Control is determined as follows. If CPS Green Zone operation is enforced, then the control effort resulting from the CPS Green Zone Control logic is compared with the control effort resulting from the Predictive CPS Control logic. If they are in the same direction, the greater correction is used. If they are in the opposite directions, the control effort obtained from the CPS Green Zone Control logic is used. If there is no control effort from the CPS Green Zone Control and there is control effort from the Predictive CPS Control, the control effort from the Predictive CPS Control is used. If there is no control effort from the Predictive CPS Control, the control effort from the CPS Green Zone Control is used. If the CPS Green Zone operation is not in force, then the Predictive CPS Control will prevail.

CPS Green Zone Operation and Control, and the prioritization of CPS Green Zone Control and Predictive CPS Control is described in more detail below.

The CPS Green Zone Operation involves making use of the running current clock-minute ACE average and the running clock-10-minute ACE average, and determining the control effort to bring the (F, ACE) on the clock-minute within the green zone if it is outside.

The main program responsible for LFC calculates how much control effort is needed to meet the CPS1/CPS2 requirements for the current clock minute in the case that CPS1/CPS2 standards are applied. This also impacts the operation of Predictive CPS control if the Predictive CPS control is selected. The CPS1 and CPS2 standards can be expressed mathematically as follows:

$$ACE = -10B\Delta f + \Delta I \tag{1}$$

where B designates the control area's frequency bias, $\Delta I$ the area's net interchange deviation as the difference between the area's actual net interchange and its scheduled net interchange. $\overline{ACE}_1$ designates the clock-minute ACE average, $\overline{\Delta f}_1$ the clock-minute frequency deviation average; $\overline{ACE}_{10}$ the clock ten-minute ACE average. The instantaneous $CPS_1$ is given by $$CPS_1 = 100\% \times \left(2 - \frac{1}{-10B\varepsilon_1^2} \times \Delta f \times ACE\right). \tag{2}$$

The NERC mandated reporting CPS1, denoted as $\overline{CPS}_1$, is computed using a similar equation but all the quantities involved are clock-minute based and the 12-month rolling averages is calculated to arrive at the final $\overline{CPS}_1$. NERC requires that $$\overline{CPS}_1 \geq 100\%. \tag{3}$$

The NERC required CPS2, denoted as $\overline{CPS}_2$, is based on the total number of clock ten-minutes periods in the month and the number of clock ten-minutes periods in which $\overline{ACE}_{10}$ exceeds a calculated and well-defined MW limit $L_{10} = 1.65\varepsilon_{10}\sqrt{(-10B)(-10B_s)}$ where $B_s$ is the frequency bias of the interconnection. That is, it is desirable to have | $\overline{ACE}_{10}|\leq L_{10}$. NERC requires that for each month, $$\overline{CPS}_2 \geq 90\%. \tag{4}$$

Figure 3:
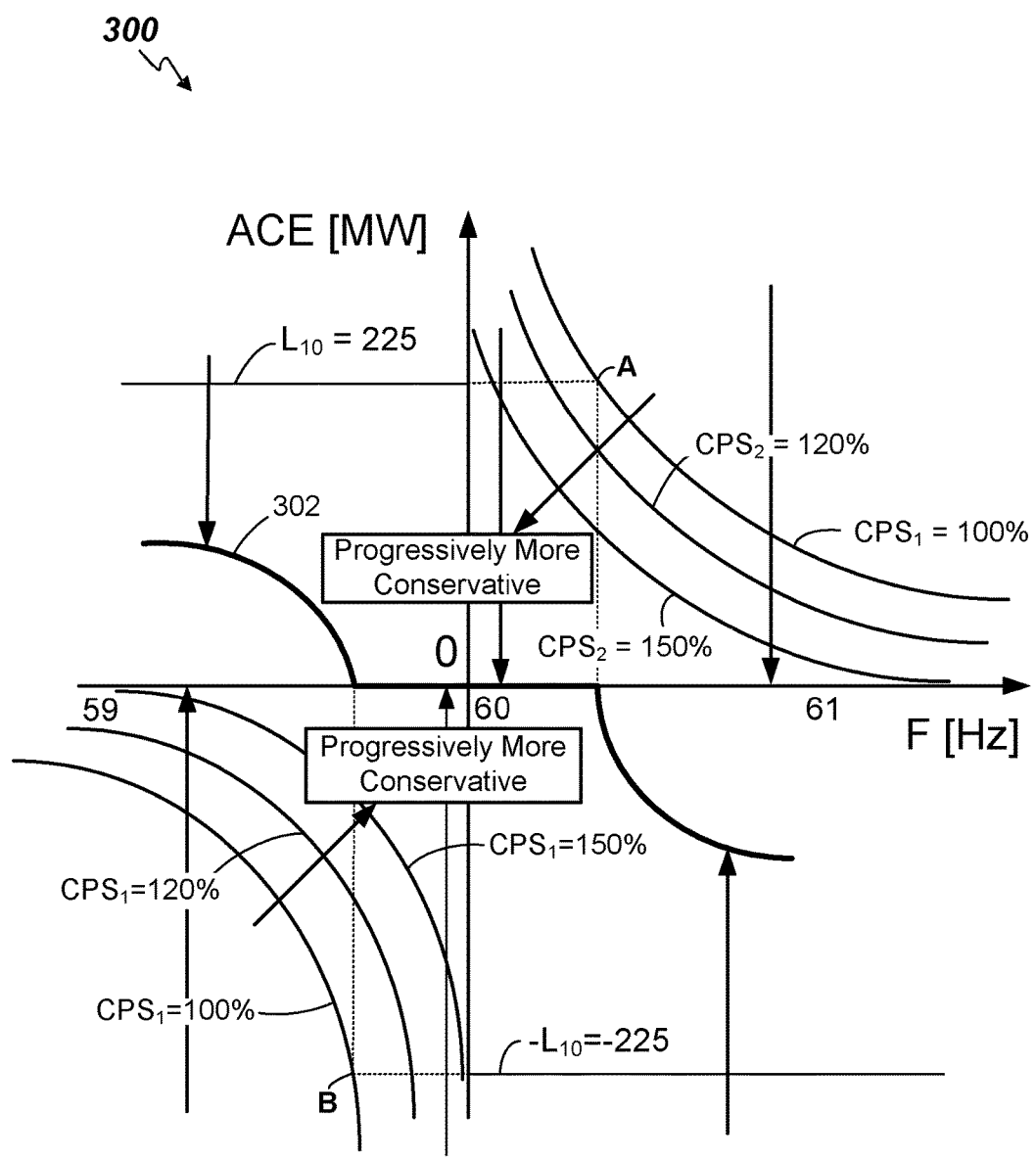
FIG. 3 illustrates a graph depicting an example of a control performance standard green zone operating range for an energy management system according to some embodiments.

With respect to the graph 300 of FIG. 3, the CPS green zone is formed by the two branches of the CPS1 related hyperbolic curve in the first and third quadrant, and the L10 line mostly in the second quadrant and also extending into the first quadrant, and −L10 line mostly in the fourth quadrant and also extending into the third quadrant.

Figure 4:
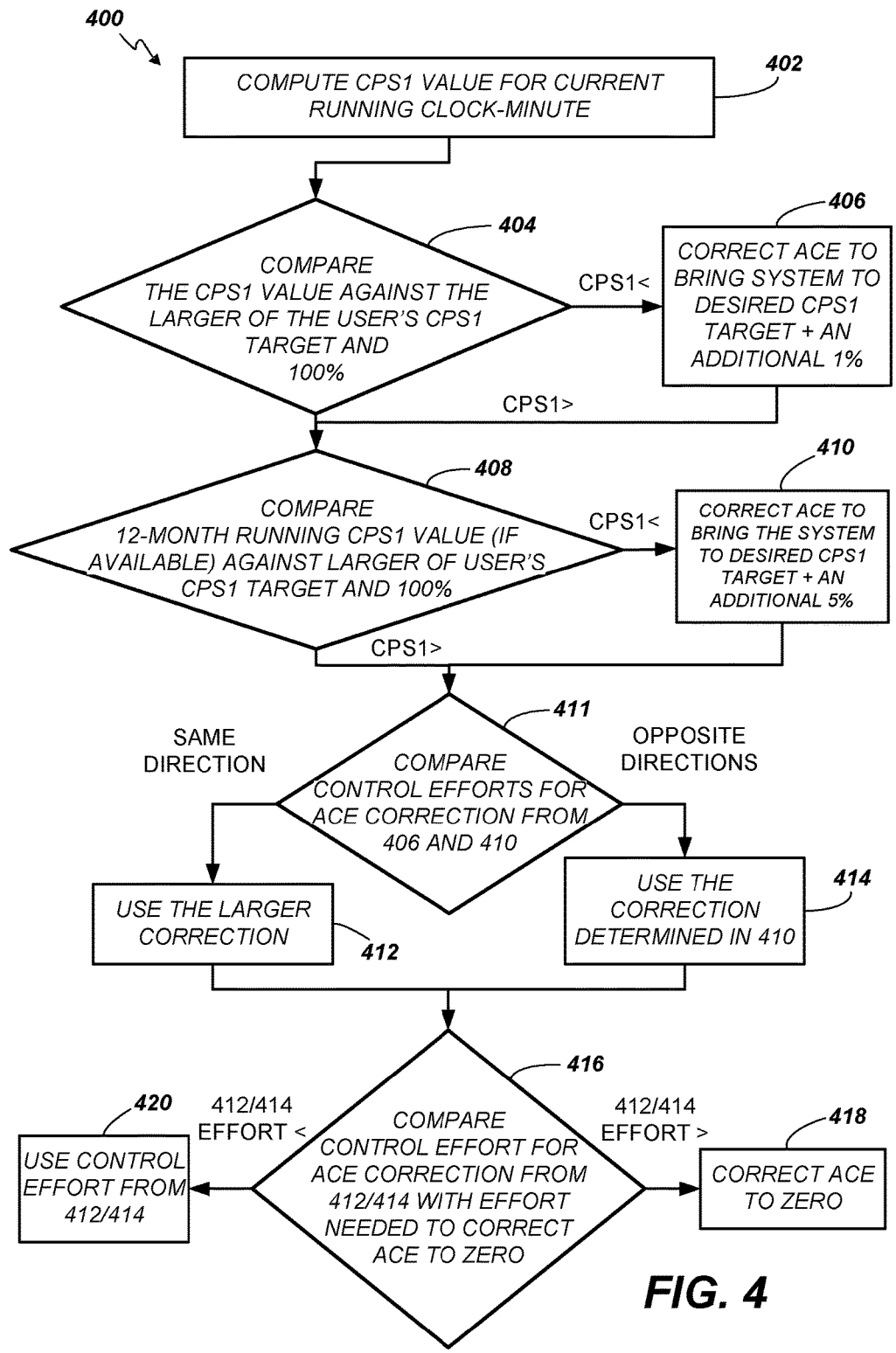
FIG. 4 illustrates a flowchart depicting a first example method according to some embodiments.

Turning to FIG. 4, to determine the correction for CPS1 control, the following method 400 can be employed. The CPS1 value for the current running clock-minute is initially computed (402). Next, the CPS1 value is compared against the larger of the user's CPS1 target and 100% (404). If CPS1 is less, then the control action is to correct ACE to bring the system to the desired CPS1 target plus an additional 1% (which is a configurable value) (406). A process for determining the ACE correction amount is described below. If the 12-month running CPS1 value is available, it is compared against the larger of the user's CPS1 target and 100% (408). If CPS1 is less, the control action is to correct ACE to bring the system to the desired CPS1 target plus an additional 5% (which is a configurable value) (410). The directions of the corrections in 406 and 410 are compared (411). If the control efforts for ACE correction from 406 and from 410 are in the same direction, then the larger correction is used (412). If the control efforts for ACE correction from 406 and from 410 are in opposite directions, then the control effort from 410 prevails (414). The control effort from 412/414 is compared to the control effort needed to correct ACE to 0 (416). If the control effort from 412/414 is greater in magnitude, then ACE is simply corrected to zero (418); else the control effort from 412/414 is used for CPS1 correction (420).

Figure 5:
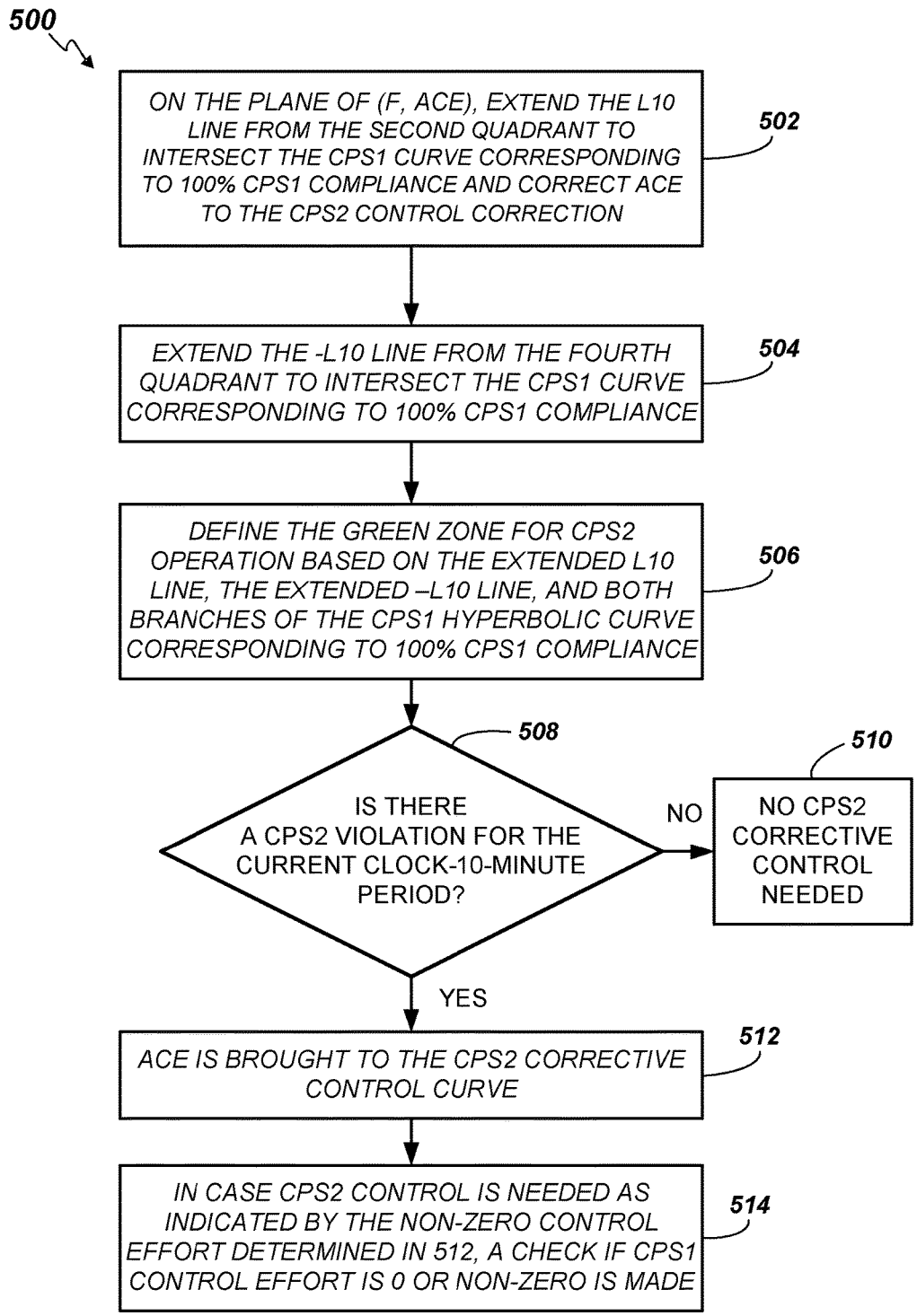
FIG. 5 illustrates a flowchart depicting a second example method according to some embodiments.

Turning to FIG. 5 (and with reference to FIG. 3), to determine the correction for CPS2 control, the following method 500 can be employed. On the plane of (F, ACE), extend the L10 line from the second quadrant to intersect the CPS1 curve corresponding to 100% CPS1 compliance and correct ACE to the CPS2 control correction (502). Extend the −L10 line from the fourth quadrant to intersect the CPS1 curve corresponding to 100% CPS1 compliance (504). The extended L10 line, the extended −L10 line, and both branches of the CPS1 hyperbolic curve corresponding to 100% CPS1 compliance for the green zone for CPS2 operation (506). Determine if a CPS2 violation has occurred for the current clock-10-minute period (508). If there is no CPS2 violation for the current clock-10-minute period, then there is no CPS2 corrective control (510). Otherwise, the CPS2 control effort for ACE correction is to bring ACE to the CPS2 corrective control curve (512). The CPS2 corrective control curve and how the ACE correction amount is determined are discussed in detail below. In case CPS2 control is needed as indicated by the non-zero control effort determined in 508, check if CPS1 control effort is 0 or non-zero (514).

Referring back to FIG. 3, the applicable green zone for CPS1/CPS2 green zone operation according to embodiments is shown in graph 300. The upper boundary of the CPS green zone is defined by the L10 line and the 100% CPS1 compliance curve in the first quadrant. The lower boundary of the CPS green zone is defined by the −L10 line and the 100% CPS1 compliance curve in the third quadrant. Note that the L10 line extends to the first quadrant and intersects with the 100% CPS1 compliance curve at point A; and the −L10 line extends to the third quadrant and intersects with the 100% CPS1 compliance curve at point B. In some embodiments, additional error margins or cushions can be added resulting in tighter zones, for instance, the CPS1 curves corresponding to 120% or 150% CPS1 compliance could be used.

Mathematically, the upper boundary curve of the green zone may be derived as follows. The L10 line is given by:

ACE=L$_{10}$

The hyperbolic curve in the first quadrant is computed from Eq. (2) from above, $\Delta f \times ACE = (2-CPS_1)(-10B)\varepsilon_1^2$, where $CPS_1$ is the operator defined, desired compliance target with a minimum of 100% minus the NERC requirement. Note that in the first quadrant, $\Delta f \geq 0$ and $ACE \geq 0$ and $\Delta f$ is 0 when F is equal to the scheduled frequency (or nominal frequency)

and that this equation represents hyperbolic curves graphically. For the intersection point A, for the default 100% CPS1 compliance, the equation reduces to $\Delta f \times ACE = -10B\varepsilon_1^2$.

The coordinates of the intersection point A can be readily determined with $F_s$ designating the scheduled frequency (or nominal frequency) with a default value of 60 Hz:

$$A: \left(F_s + \frac{-10B\varepsilon_1^2}{L_{10}}, L_{10}\right)$$

Similarly, the lower boundary curve of the green zone may be derived as follows. The −L10 line is given by:

ACE=−L$_{10}$

The hyperbolic curve in the third quadrant is computed from Eq. (2) above, $\Delta f \times ACE = (2-CPS_1)(-10B)\varepsilon_1^2$, Where $CPS_1$ is the operator defined desired compliance target with a minimum of 100%—the NERC requirement. Note that in the third quadrant, $\Delta f \leq 0$ and $ACE \leq 0$. Intersection point B can be determined for the default 100% CPS1 compliance, using the equation reduced to $\Delta f \times ACE = -10B\varepsilon_1^2$.

The coordinates of the intersection point B can be readily determined with $F_s$ designating the scheduled frequency (or nominal frequency) with a default value of 60 Hz:

$$B: \left(F_s + \frac{10B\varepsilon_1^2}{L_{10}}, -L_{10}\right)$$

The CPS2 control strategy is illustrated in the graph 300 of FIG. 3 and operates as follows. First, the central separation curve that splits the CPS green zone is computed and identified in the graph. For every frequency value, the ACE value on the central curve is computed as the average of the upper boundary curve and the lower boundary curve of the CPS green zone. This central separation curve 302 is shown as a bold line. Mathematically, this central separation curve may be given by:

$$ACE = \begin{cases} \frac{1}{2}\left(L_{10} + \frac{-10B\varepsilon_1^2}{\Delta f}\right), & \text{if } \Delta f < \frac{10B\varepsilon_1^2}{L_{10}} \\ 0, & \text{if } \frac{10B\varepsilon_1^2}{L_{10}} \leq \Delta f \leq -\frac{10B\varepsilon_1^2}{L_{10}} \\ \frac{1}{2}\left(-L_{10} + \frac{-10B\varepsilon_1^2}{\Delta f}\right), & \text{if } \Delta f > -\frac{10B\varepsilon_1^2}{L_{10}} \end{cases}$$

If clock-ten-minute ACE is above L10, and if the frequency is less than the frequency for the point A (intersection point of the L10 line and 100% CPS1 curve in the first quadrant), the CPS2 control attempts to bring the ACE to the central separation curve. If the clock-ten-minute ACE is above L10, and if the frequency is greater than the frequency for the point A, the CPS2 control aims at bringing the ACE to 0.

If clock-ten-minute ACE is below −L10, and if the frequency is greater than the frequency for the point B (intersection point of the −L10 line and 100% CPS1 curve in the third quadrant), the CPS2 control attempts to bring the ACE to the central separation curve. If the clock-ten-minute ACE is below −L10, and if the frequency is less than the frequency for the point B, the CPS2 control aims at bringing the ACE to 0.

Note that in some embodiments, tuning parameters, e.g., gains, may be added and applied as deemed helpful.

Figure 6:
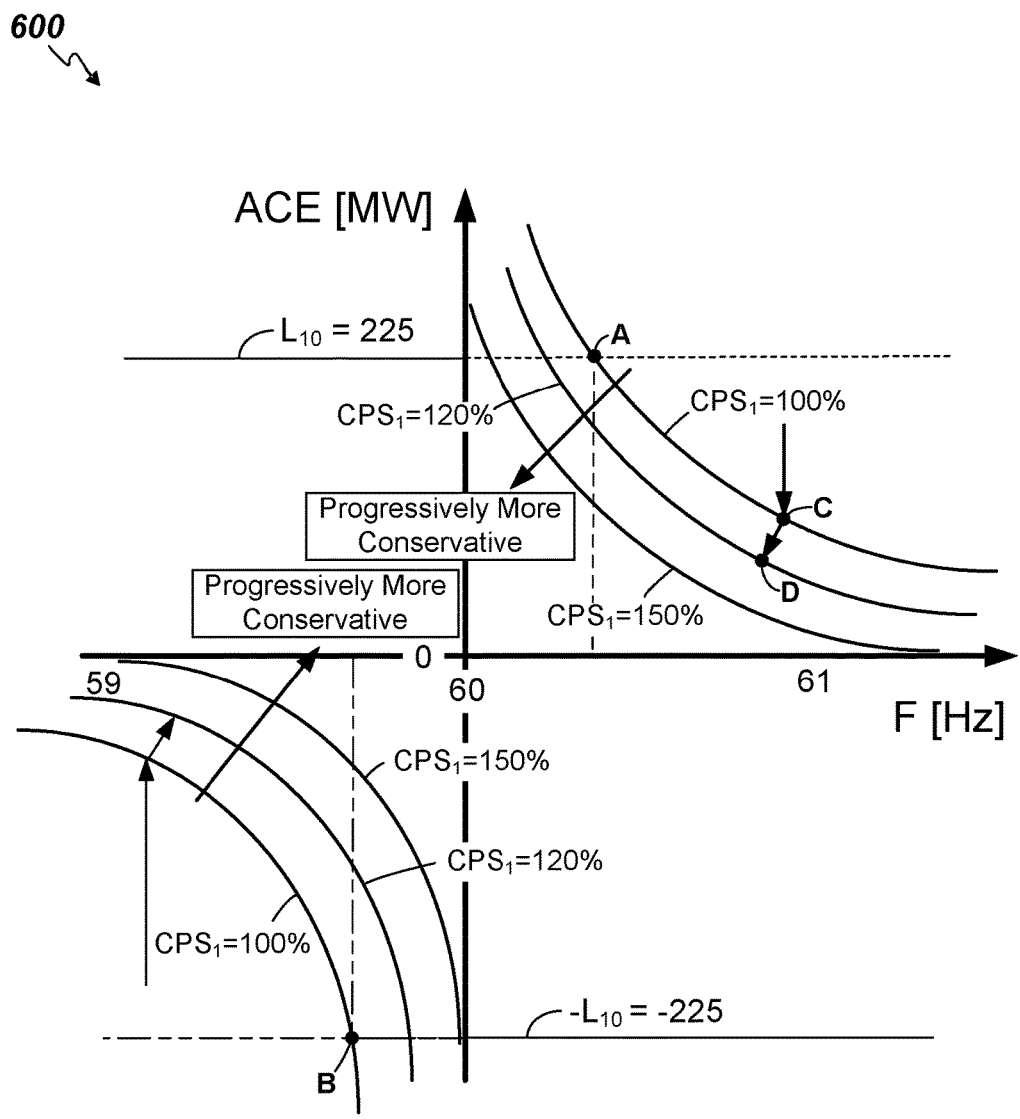
FIG. 6 illustrates a graph depicting an example of an AGC control strategy for an energy management system according to some embodiments.

As illustrated in the graph 600 of FIG. 6, CPS1 control only applies to the first quadrant and third quadrant. Even in the first and third quadrants, when the current clock-10-minute ACE average is above L10 or below −L10, CPS2 control takes priority. Therefore, CPS1 control is applicable only if (F, ACE) falls within the first or third quadrant, and the current clock-10-minute ACE average is below L10 in the first quadrant or above −L10 in the third quadrant.

In case of a CPS1 compliance violation for the current clock minute, the CPS1 control is aimed at correcting ACE to the 100% CPS1 compliance curve; and additional effort is applied to bring ACE to the operator specified tighter CPS1 compliance curve (for instance, the 120% CPS1 compliance); and furthermore, extra effort is spent for more security considering some deadband. For instance, if the operator decides to set the CPS1 compliance target to 150%, then the CPS1 control effort is constructed as follows. First, the ACE change is determined by bringing ACE vertically to the 100% CPS1 compliance curve. The negated value of this quantity constructs the first component of the CPS1 control effort. Let the current clock-minute ACE and F average values be ACE0 and F0, and accordingly let the frequency deviation be denoted by $\Delta f_0$. The control effort $u_1$ in this step may be given by:

$$u_1 = -\left[ACE_0 - \frac{-10B\varepsilon_1^2}{\Delta f_0}\right].$$

Note that $$\left(\Delta f_0, \frac{-10B\varepsilon_1^2}{\Delta f_0}\right)$$

is a point (e.g., point C) on the CPS1 curve that has 100% CPS1 compliance.

$$C: \left(\Delta f_0, \frac{-10B\varepsilon_1^2}{\Delta f_0}\right)$$

Next it is determined how much minimum effort is needed from the 100% CPS1 compliance to 150%. Equivalently, this is to find from point (F, ACE) the shortest distance to the desired control performance compliance curve, and determine the direction. This can be achieved by moving in the gradient direction. This becomes the second component of the CPS1 control effort.

From point C of the above step, find in the gradient direction of the hyperbolic curve toward the desired compliance. The gradient direction is perpendicular to the tangent direction at point C. Let the line that passes through point C and in the gradient direction intersect the compliance curve corresponding to the desired compliance target (say 150%, or in general x %) at point D. Then the line equation for CD may be given by (for convenience, express the line equation in terms of variables $\Delta f$ and ACE instead of f and ACE):

$$\left(ACE + \frac{10B\varepsilon_1^2}{\Delta f_0}\right) = \frac{\Delta f_0^2}{-10B\varepsilon_1^2}(\Delta f - \Delta f_0)$$

In addition, point D can be determined as the solution to the following equation group:

$$\begin{cases} ACE = (2 - x\%)\frac{-10B\varepsilon_1^2}{\Delta f} \\ \left(ACE + \frac{10B\varepsilon_1^2}{\Delta f_0}\right) = \frac{\Delta f_0^2}{-10B\varepsilon_1^2}(\Delta f - \Delta f_0) \end{cases}$$

Define $d = -10B\varepsilon_1^2$, $$a = \frac{\Delta f_0^2}{d^2}, \; b = \left(\frac{1}{\Delta f_0} - \frac{\Delta f_0^3}{d^2}\right),$$

$c(x) = -(2-x\%)$ (Note that c is a function of x. Simply use c instead of c(x) if no confusion arises; otherwise use c(x)). The above equation group leads to a quadratic equation: $a\Delta f^2 + b\Delta f + c = 0$ with a valid solution:

$$\Delta f = \frac{-b + \sqrt{b^2 - 4ac}}{2a}$$

for the first quadrant; and $$\Delta f = \frac{-b - \sqrt{b^2 - 4ac}}{2a}$$

for the third quadrant. Accordingly, $$ACE = -cd/\Delta f = \frac{d\left(\sqrt{b^2 - 4ac} + b\right)}{2}$$

for the first quadrant; and $$ACE = -\frac{d\left(\sqrt{b^2 - 4ac} - b\right)}{2}$$

for the third quadrant.

$$D: \left(\frac{-b+\sqrt{b^2-4ac}}{2a}, \frac{d(\sqrt{b^2-4ac}+b)}{2}\right)$$

for the first quadrant; or $$D: \left(\frac{-b-\sqrt{b^2-4ac}}{2a}, -\frac{d(\sqrt{b^2-4ac}+b)}{2}\right)$$

for the third quadrant.

Note that in some embodiments, the desired compliance target must be equal to or greater than 100%—which is automatically satisfied as this is mandated by NERC; and also the desired compliance target in order to be meaningful in the above equation cannot be greater than 200%—as in that case, there is no need to make any non-zero CPS1 control effort. The control effort in this step may be expressed as (a gain factor may be applied as deemed necessary):

$$u_2 = -\left[\frac{-10B\varepsilon_1^2}{\Delta f_0} - \frac{d(\sqrt{b^2-4ac}+b)}{2}\right]$$

for the first quadrant;

$$u_2 = -\left[\frac{-10B\varepsilon_1^2}{\Delta f_0} + \frac{d(\sqrt{b^2-4ac}-b)}{2}\right]$$

for the third quadrant.

Thereafter, a determination is made as to how much CPS1 compliance deadband is going to be used. If it is the current clock minute over which the CPS1 compliance violation occurs, then maybe 1% (user configurable) may be applied, although other values may be used. If it is the 12-month CPS1 violation, then maybe a larger deadband may be applied, such as 5% (which again is user configurable and other values may be used). Let the extra compliance be denoted as y %.

The same approach may be employed to determine how much effort is needed for this extra performance security. The control effort from this step $u_3$ can be directly combined into the step for deriving $u_2$. The resulting combined control effort $u_4$ is given by:

$$u_4 = -\left[\frac{-10B\varepsilon_1^2}{\Delta f_0} - \frac{d(\sqrt{b^2-4ac(x+y)}+b)}{2}\right]$$

for the first quadrant;

$$u_4 = -\left[\frac{-10B\varepsilon_1^2}{\Delta f_0} + \frac{d(\sqrt{b^2-4ac(x+y)}-b)}{2}\right]$$

for the third quadrant.

Combining all three effort amounts together produces:
For the first quadrant, the total control effort is given by $$u = u_1 + u_4 = -\left[ACE_0 - \frac{-10B\varepsilon_1^2}{\Delta f_0}\right] - \left[\frac{-10B\varepsilon_1^2}{\Delta f_0} - \frac{d(\sqrt{b^2-4ac(x+y)}+b)}{2}\right].$$

For the third quadrant, the total control effort is given by $$u = u_1 + u_4 = -\left[ACE_0 - \frac{-10B\varepsilon_1^2}{\Delta f_0}\right] - \left[\frac{-10B\varepsilon_1^2}{\Delta f_0} + \frac{d(\sqrt{b^2-4ac(x+y)}-b)}{2}\right].$$

At each of the above steps, appropriate gain factors may be applied if so desired.

In some embodiments, the enhanced LFC application utilizes the real-time operational database for fast data input/output (I/O). The following data pieces may be used for the comprehensive CPS green zone control: historical data from the Historical Information System (HIS) including ACE, frequency deviation, interchange error, frequency bias for the current month and past 12 months; static data including $\varepsilon_1$, $\varepsilon_{10}$, etc.; dynamic input data including the real-time measurements, calculated values and user input data such as: Current ACE, Current frequency, Frequency bias; Current net interchange; Net interchange schedule; Control area's CPS1 performance target and additional CPS1 performance cushion, and Control area's CPS2 performance target; working data that has been pre-processed by the LFC module to set up the formulation of the CPS green zone control model; and output data resulting from solving the CPS green zone control including the desired generation and system regulation.

In some embodiments, the enhanced LFC module is split into two parts from an implementation perspective: (1) the LFC application that does data pre-processing prepares data in a form that can be accepted by the Comprehensive CPS Green Zone Control engine, obtains the solution results from the Comprehensive CPS Green Zone Control engine, performs post-processing, and stores results into the operational database; and (2) the Comprehensive CPS Green Zone Control Engine that includes a number of functions/procedures callable from within the LFC application. The Comprehensive CPS Green Zone Control Engine receives various input data, performs optimal CPS green zone control, and saves the solution results into the application supplied output data structures.

Figure 7:
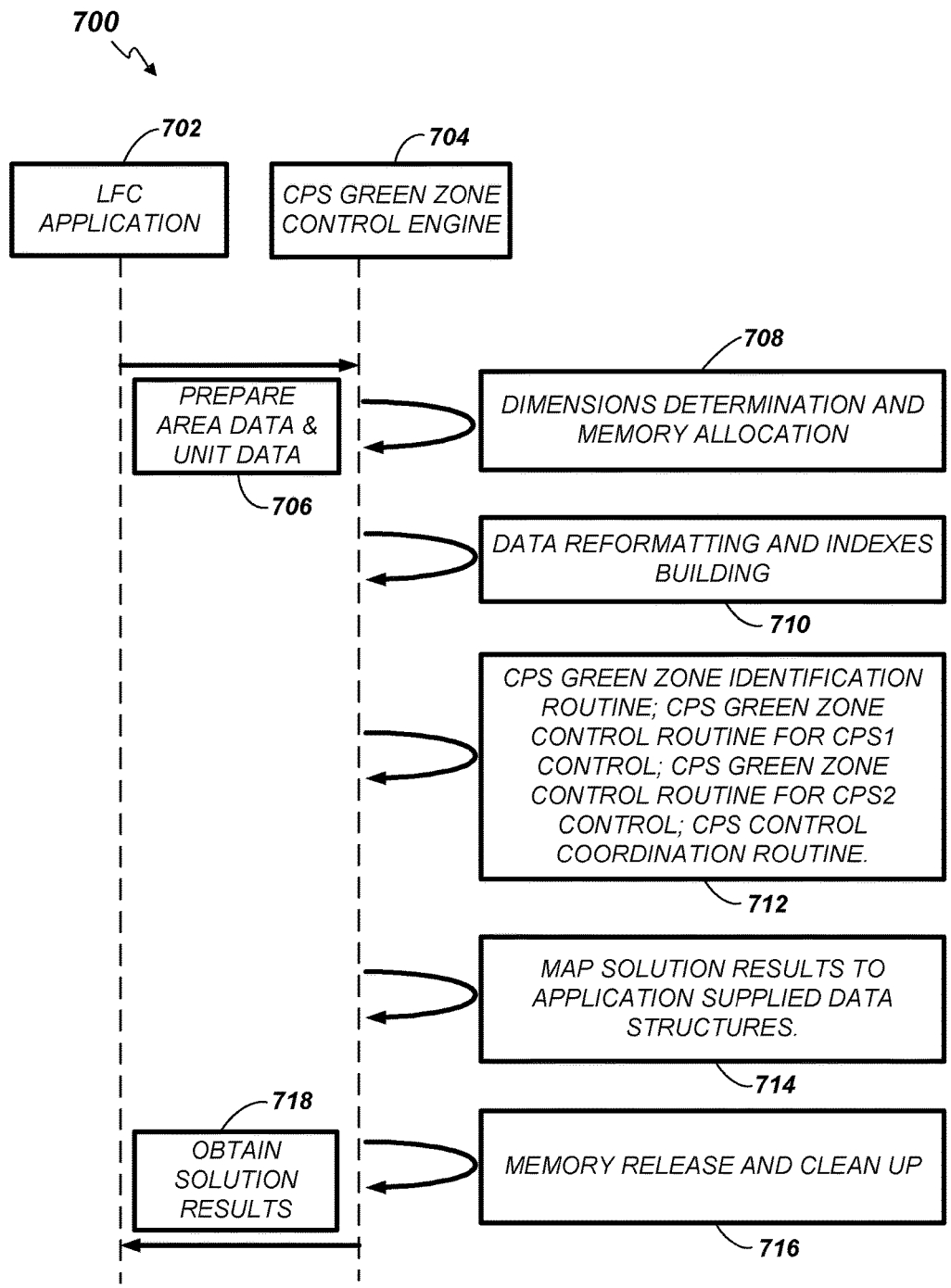
FIG. 7 illustrates a sequence chart illustrating an example load frequency control method according to some embodiments.

FIG. 7 is a sequence chart 700 depicting interaction between an enhanced LFC application 702 and the CPS green zone control engine 704. The LFC application 702 prepares control area data and AGC generating unit data for the CPS green zone control engine 704 (706). The CPS green zone control engine 704 then performs the methods described above. A determination of the data dimensions to be used is initially made and memory is allocated for storage of the anticipated data (708). Next the various data described above is reformatted and indexes into the data are built (710). Then, various software routines, modules, and/or processes as described above are executed (712). Among others, these routines, modules, and/or processes can include a CPS green zone identification routine; a CPS Green Zone Control routine for CPS1 Control; a CPS Green Zone Control routine for CPS2 control; and a CPS Control Coordination routine. Next the solution results are mapped to the LFC application supplied data structures (714). The CPS green zone control engine 704 releases the memory and cleans up any disassociated data. Finally, the solution results are populated into LFC application 702 supplied data structures (718).

In some embodiments, a power distribution system 100 using automatic generation control is provided. The system 100 includes a plurality of power generating resources 108 operating within a control area; a plurality of power consuming loads 112; a power transmission network 114 coupling the resources 108 to the loads 112; and an energy management system 104 (EMS) in communication with the resources 108 and configured to control operation of the resources 108 within the control area. The EMS 104 is operative to: determine a control performance standard (CPS) green zone 506; operate an automatic generation control 106 (AGC) system of the EMS 104 in the determined CPS green zone 400; and output electricity to the loads 112 from the power generating resources 108 under the control of the AGC 106 of the EMS 104 operating in the green zone (as depicted in the graph 300 of FIG. 3).

In some other embodiments, a power distribution method using AGC is provided. The method includes determining a CPS green zone 506; operating an AGC system of an EMS in the determined CPS green zone 400; and outputting electricity to a plurality of loads 112 from a plurality of generating resources 108 under the control of the AGC 106 of the EMS 104 operating in the green zone (as depicted in the graph 300 of FIG. 3).

In yet other embodiments, an energy management system 104 using automatic generation control is provided. The energy management system 104 includes a processor 202 in communication with a plurality of power generating resources 108; and a memory storing instructions executable on the processor. The instructions are operable to determine a CPS green zone 506; operate an AGC system of the EMS in the determined CPS green zone 400; and output electricity to the loads 112 from the resources 108 under the control of the AGC 106 of the EMS 104 operating in the green zone (as depicted in the graph 300 of FIG. 3).

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed embodiments.

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A power distribution system comprising:
a plurality of power generating resources operating within a control area;
a plurality of power consuming loads;
a power transmission network coupling the resources to the loads; and
an energy management system (EMS) in communication with the resources and configured to control operation of the resources within the control area, wherein the EMS is operative to:
determine a control performance standard (CPS) green zone;
operate an automatic generation control (AGC) system of the EMS within the determined CPS green zone; and
output electricity to the loads from the resources under the control of the AGC of the EMS operating within the green zone.

2. The power distribution system of claim 1 wherein the CPS green zone is determined based upon an intersection of CPS1 and CPS2 operating limits.

3. The power distribution system of claim 1 wherein the CPS green zone is defined by an upper boundary determined based on area control error (ACE) and a first portion of a pre-defined percentage CPS1 compliance curve and a lower boundary determined based on negative ACE and a second portion of the pre-defined percentage CPS1 compliance curve.

4. The power distribution system of claim 1 wherein the energy management system includes a predictive CPS1 control module operative to determine a one-minute area control error (ACE) target for short term CPS1 control based on CPS1 performance statistics over a most recent approximate one year period.

5. The power distribution system of claim 1 wherein the energy management system includes a predictive CPS2 control module operative to determine a ten-minute ACE target for short term CPS2 control based on CPS2 performance statistics over a current month up to a current moment.

6. The power distribution system of claim 1 wherein the energy management system includes an instantaneous CPS1 control module operative to determine an amount of control effort for CPS1 control based on a one-minute ACE target derived from long term CPS1 control.

7. The power distribution system of claim 1 wherein the energy management system includes an instantaneous CPS2 control module operative to determine an amount of control effort for CPS2 control based on a ten-minute ACE target derived from long term CPS1 control.

8. A method of power distribution using AGC, the method comprising:
   determining a CPS green zone;
   operating an AGC system of an EMS in the determined CPS green zone; and
   outputting electricity to a plurality of loads from a plurality of generating resources under the control of the AGC operating in the CPS green zone.

9. The method of claim 8 wherein the CPS green zone is determined based upon an intersection of CPS1 and CPS2 operating limits.

10. The method of claim 8 wherein the CPS green zone is defined by an upper boundary determined based on area control error (ACE) and a first portion of a pre-defined percentage CPS1 compliance curve and a lower boundary determined based on negative ACE and a second portion of the pre-defined percentage CPS1 compliance curve.

11. The method of claim 8 wherein the energy management system includes a predictive CPS1 control module operative to determine a one-minute area control error (ACE) target for short term CPS1 control based on CPS1 performance statistics over a most recent approximate one year period.

12. The method of claim 8 wherein the energy management system includes a predictive CPS2 control module operative to determine a ten-minute ACE target for short term CPS2 control based on CPS2 performance statistics over a current month up to a current moment.

13. The method of claim 8 wherein the energy management system includes an instantaneous CPS1 control module operative to determine an amount of control effort for CPS1 control based on a one-minute ACE target derived from long term CPS1 control.

14. The method of claim 8 wherein the energy management system includes an instantaneous CPS2 control module operative to determine an amount of control effort for CPS2 control based on a ten-minute ACE target derived from long term CPS1 control.

15. An energy management system (EMS) comprising:
   a processor in communication with a plurality of power generating resources; and
   a memory storing instructions executable on the processor, the instructions being operable to:
   determine a CPS green zone;
   operate an AGC system of the EMS in the determined CPS green zone; and
   output electricity to the loads from the resources under the control of the AGC operating in the green zone.

16. The EMS of claim 15 wherein the CPS green zone is determined based upon an intersection of CPS1 and CPS2 operating limits and is defined by an upper boundary determined based on area control error (ACE) and a first portion of a pre-defined percentage CPS1 compliance curve and a lower boundary determined based on negative ACE and a second portion of the pre-defined percentage CPS1 compliance curve.

17. The EMS of claim 15 wherein the energy management system includes a predictive CPS1 control module operative to determine a one-minute area control error (ACE) target for short term CPS1 control based on CPS1 performance statistics over a most recent approximate one year period.

18. The EMS of claim 15 wherein the energy management system includes a predictive CPS2 control module operative to determine a ten-minute ACE target for short term CPS2 control based on CPS2 performance statistics over a current month up to a current moment.

19. The EMS of claim 15 wherein the energy management system includes an instantaneous CPS1 control module operative to determine an amount of control effort for CPS1 control based on a one-minute ACE target derived from long term CPS1 control.

20. The EMS of claim 15 wherein the energy management system includes an instantaneous CPS2 control module operative to determine an amount of control effort for CPS2 control based on a ten-minute ACE target derived from long term CPS1 control.

* * * * *